(12) United States Patent
Mizumaki

(10) Patent No.: US 7,843,093 B2
(45) Date of Patent: Nov. 30, 2010

(54) DRIVING DEVICE

(75) Inventor: Masao Mizumaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 418 days.

(21) Appl. No.: 11/404,625

(22) Filed: Apr. 14, 2006

(65) Prior Publication Data

US 2006/0232144 A1    Oct. 19, 2006

(30) Foreign Application Priority Data

Apr. 15, 2005    (JP)    ............................. 2005-118468

(51) Int. Cl.
*H02K 37/12*    (2006.01)
(52) U.S. Cl. ...................... 310/49 R; 310/80
(58) Field of Classification Search ............... 310/80
See application file for complete search history.

(56) References Cited

U.S. PATENT DOCUMENTS

| | | | |
|---|---|---|---|
| 4,944,650 A | 7/1990 | Matsumoto | |
| 5,757,108 A | 5/1998 | Suzuki | |
| 5,831,356 A | 11/1998 | Aoshima et al. | |
| 5,854,526 A | 12/1998 | Sakamoto | |
| 5,980,194 A | 11/1999 | Freerks et al. | |
| 6,032,512 A | 3/2000 | Li | |
| 6,043,574 A | 3/2000 | Prudham | |
| 6,255,749 B1 | 7/2001 | Aoshima et al. | |
| 6,275,742 B1 | 8/2001 | Sagues et al. | |
| 6,463,782 B1 | 10/2002 | Shen et al. | |
| 6,556,887 B2 | 4/2003 | Freeman et al. | |
| 6,558,509 B2 | 5/2003 | Kraus et al. | |
| 6,582,175 B2 | 6/2003 | Cox et al. | |
| 2003/0007799 A1 | 1/2003 | Aoshima | |
| 2003/0113187 A1 | 6/2003 | Lei et al. | |
| 2003/0205941 A1* | 11/2003 | Suzuki et al. | ............. 310/49 R |

(Continued)

FOREIGN PATENT DOCUMENTS

CN    1521921    8/2004

(Continued)

OTHER PUBLICATIONS

Relevant portion of European Search Report of corresponding Patent Application No.06112640.5-2207 with issue date of Aug. 17, 2006.

*Primary Examiner*—Renee S Luebke
*Assistant Examiner*—Jason Collins
(74) *Attorney, Agent, or Firm*—Rossi, Kimms & McDowell LLP

(57) ABSTRACT

A stepping motor as a driving device has a stator with a plate part, and first and second outer magnetic pole parts axially extending from the plate part. A rotor formed by a rotary shaft and a core, each formed of a soft magnetic material, are disposed between the outer magnetic pole parts. The rotor has one axial end rotatably supported in the plate part. A magnet is rigidly fitted on an outer periphery of the rotor and magnetized such that different poles circumferentially alternate. A top plate is rigidly secured to the respective foremost ends of the pole parts and rotatably supports the other axial end of the rotor. The pole parts are engaged in a bobbin having a cover part covering the outer peripheral surface of the magnet. First and second coils are wound around the outer magnetic pole parts via the bobbin.

3 Claims, 11 Drawing Sheets

U.S. PATENT DOCUMENTS

2004/0212274 A1* 10/2004 Mizumaki .................. 310/254

FOREIGN PATENT DOCUMENTS

| | | |
|---|---|---|
| EP | 0 801 459 A1 | 10/1997 |
| EP | 1 041 698 A2 | 10/2000 |
| JP | 05-091191 A | 4/1993 |
| JP | 7-336938 A | 12/1995 |
| JP | 09-331666 A | 12/1997 |
| JP | 3327406 B2 | 7/2002 |

* cited by examiner

DRIVING DEVICE

BACKGROUND OF THE INVENTION

1. Field of the Invention

The present invention relates to a driving device which is applied to a stepping motor.

2. Description of the Related Art

There have conventionally been proposed various types of stepping motors for use as drive sources for various kinds of devices. A stepping motor according to a first prior art is reduced in the diameter from the center of the rotational axis thereof and is at the same time enhanced in output power (see e.g. Japanese Laid-Open Patent Publication (Kokai) No. H09-331666).

FIG. 10 is an exploded perspective view of the stepping motor according to the first prior art, and FIG. 11 is a longitudinal cross-sectional view showing the internal construction of the stepping motor shown in FIG. 10, in an assembled state.

As shown in FIGS. 10 and 11, the stepping motor according to the first prior art is comprised of a rotor 201, a first coil 202, a second coil 203, a first stator 204, a second stator 205, an output shaft 206, and a connection ring 207.

The first stator 204 and the second stator 205 are formed of a soft magnetic material. The two rotors 204 and 205 are disposed in a manner opposed to each other in the axial direction of the stepping motor with a predetermined gap therebetween. The connection ring 207 is formed of a non-magnetic material, and holds the first stator 204 and the second stator 205 with the predetermined gap between the two stators 204 and 205. The output shaft 206 is rotatably held by a bearing 204E of the first stator 204 and a bearing 205E of the second stator 205. The rotor 201 is rigidly secured to the output shaft 206, and is formed by a magnet (permanent magnet) which is circumferentially divided into four sections which are magnetized such that they have alternately different poles.

As shown in FIG. 11, the first stator 204 has a foremost end which is comb-teeth-shaped, and includes first outer magnetic pole parts 204A and 204B which are opposed to an outer peripheral surface of the rotor 201 with a gap between the first outer magnetic pole parts 204A and 204B and the outer peripheral surface of the rotor 201, and first inner magnetic pole parts 204C and 204D which are opposed to an inner peripheral surface of the rotor 201 with a gap between the first inner magnetic pole parts 204C and 204D and the inner peripheral surface of the rotor 201. The second stator 205 includes second outer magnetic pole parts 205A and 205B which are opposed to the outer peripheral surface of the rotor 201 with a gap between the second outer magnetic pole parts 205A and 205B and the outer peripheral surface of the rotor 201, and second inner magnetic pole parts 205C and 205D which are opposed to the inner peripheral surface of the rotor 201 with a gap between the second inner magnetic pole parts 205C and 205D and the inner peripheral surface of the rotor 201.

The first coil 202 for magnetizing the first stator 204 is wound around the first inner magnetic pole parts 204C and 204D in a manner adjacent to the rotor 201 in the axial direction of the motor. The second coil 203 for magnetizing the second stator 205 is wound around the second inner magnetic pole parts 205C and 205D in a manner adjacent to the rotor 201 in the axial direction of the motor.

Rotation of the rotor 201 of the stepping motor is caused as follows: The energizing direction of the first coil 202 and that of the second coil 203 are switched to thereby switch the polarities of the first outer magnetic pole parts 204A and 204B, the first inner magnetic pole parts 204C and 204D, the second outer magnetic pole parts 205A and 205B, and the second inner magnetic pole parts 205C and 205D. This causes the rotor 201 to keep rotating.

In the stepping motor constructed as above, magnetic fluxes generated by energization of the first coil 202 and the second coil 203 flow from the outer magnetic pole parts to the inner magnetic pole parts radially opposed thereto, or alternatively from the inner magnetic pole parts to the outer magnetic pole parts radially opposed thereto, whereby the magnetic fluxes efficiently act on the rotor 201 (magnet) located between the outer magnetic pole parts and the respective associated inner magnetic pole parts. Further, the distance between each outer magnetic pole part and the associated inner magnetic pole part can be set to a value almost equal to the thickness of the hollow cylindrical rotor 201, and hence it is possible to reduce the resistance of a magnetic circuit formed by the outer magnetic pole parts and the inner magnetic pole parts. This makes it possible to generate a larger amount of magnetic flux with a smaller amount of electric current, which leads to the enhancement of output power of the stepping motor.

Another stepping motor according to a second prior art is a PM stepping motor (see e.g. Japanese Patent No. 3327406 and Japanese Laid-Open Utility Model Publication (Kokai) No. H05-091191). In the stepping motor, a stator part, a bobbin part, and a cover part having a hole for holding one bearing at a location corresponding to one end surface of the stator part are integrally formed of a synthetic resin.

The stator part includes two pairs of stator yokes coaxially arranged such that the inner peripheral surface of each pair of stator yoke form a cylindrical surface. The bobbin part defines a space between the collars of each of the two pairs of stator yokes, for holding a stator coil therein. The cover part is formed therethrough with the bearing fitting hole for holding a rotary shaft and the one bearing supporting the rotary shaft at the location corresponding to the one end surface of the stator part. A stator unit has a plurality of terminal pins protruded from the cover part in the same direction as the rotary shaft extends. A rotor is disposed within a hollow cylindrical part of the stator unit, and is formed by the rotary shaft and a magnet. An outer yoke is comprised of a flange having the other bearing rigidly secured thereto, and a casing fitted on the outer periphery of the stator unit. According to this stepping motor, it is possible to minimize coaxial deviation between the inner peripheries of the stator yokes and those of the bearings.

However, the stepping motor according to the first prior art necessitates provision of predetermined gaps between the inner peripheral surface of the rotor (magnet) and the outer peripheral surfaces of the inner magnetic pole parts opposed thereto. To control the manufacturing of the stepping motors such that the predetermined gaps are formed brings about an increase in manufacturing costs thereof. Further, although the stators are required to have a shape integrating hollow cylindrical inner magnetic pole parts and outer magnetic pole parts, it is difficult to integrally form the inner magnetic pole parts and the outer magnetic pole parts.

Further, in the case where the inner magnetic pole parts and the outer magnetic pole parts are separately formed, and then assembled together into one piece, the number of component parts increases, which results in an increase in the manufacturing costs. Moreover, since the axial dimension of the stepping motor is determined by the axial length of the two coils, that of the magnet, and the thickness of the stators, the stepping motor necessitates a large axial dimension so as to maintain predetermined output power thereof. On the other hand, if the axial length of the coils or the magnet is reduced, the output power of the stepping motor is considerably lowered.

Manufacturing of the stepping motor according to the second prior art requires the use of an insert molding machine as an apparatus for integrally forming the stator part and the bobbin part. This involves a significant increase investment in equipment, which affects manufacturing costs. In other words, manufacturing of the stepping motor having the stator part and the bobbin part integrally formed as a one-piece member necessitates large investment in equipment, as mentioned above, and hence it can be practical only for mass production.

Further, since the magnet is disposed inside the stator unit including the coils, the outer diameter of the magnet has to be smaller than that of the stepping motor. If the outer diameter of the stepping motor is reduced, that of the magnet is inevitably reduced, which causes significant reduction of the output power of the stepping motor.

SUMMARY OF THE INVENTION

It is an object of the present invention to provide a low-cost and high-output driving device compact in size and reduced in axial length.

To attain the above object, in a first aspect of the present invention, there is provided a driving device comprising a stator having a base, and first and second outer magnetic pole parts axially extending from the base, a rotor formed of a soft magnetic material, the rotor being disposed between the first and second outer magnetic pole parts and having one axial end thereof rotatably supported in the base, a magnet rigidly fitted on an outer periphery of the rotor and magnetized such that different poles alternate in a circumferential direction, a lid member rigidly secured to respective foremost ends of the first and second outer magnetic pole parts and rotatably supporting another axial end of the rotor, a bobbin engaged with the first and second outer magnetic pole, the bobbin having a cover part covering an outer peripheral surface of the magnet, a first coil wound around the first outer magnetic pole part via the bobbin at an axial location between the magnet and the base, and a second coil wound around the second outer magnetic pole part via the bobbin at an axial location between the magnet and the base.

With the arrangement of the driving device according to the first aspect of the present invention, since the magnet is rigidly fitted on the outer periphery of the rotor disposed between the first and second outer magnetic pole parts of the stator, it is possible to increase the mechanical strength of the magnet and cause the rotor to serve as an inner magnetic pole part. This makes it unnecessary to provide gaps between the magnet and the inner magnetic pole parts, and makes it possible to suppress magnetic resistance, thereby enhancing the output power of the driving device.

Further, the outer diameter of the driving device can be determined by the outer diameter of the magnet and the thickness of the cover part of the bobbin, and the first and second outer magnetic pole parts of the stator are each formed to have a comb-tooth shape extending in the axial direction, so that it is possible to minimize the outer diameter and axial length of the driving device, thereby reducing the size of the same.

Furthermore, the first and second coils are both wound around the bobbin, and the bobbin also serves as a cover covering the outer peripheral surface of the magnet. Therefore, it is possible to reduce the number of component parts and manufacturing costs.

Preferably, the rotor comprises a hollow cylindrical core, and a rotary shaft rigidly fitted through a bore part of the core.

More preferably, a construction of the rotor is selected from the group consisting of a construction in which the rotary shaft is formed integrally with the core and a construction in which the rotary shaft and the core are formed as separate members.

To attain the above object, in a second aspect of the present invention, there is provided a driving device comprising a stator having a base and first and second outer magnetic pole parts axially extending from the base, a rotor formed of a soft magnetic material, the rotor being disposed between the first and second outer magnetic pole parts and having one axial end thereof rotatably supported in the base, a lead screw shaft that rotates in unison with the rotor, a magnet rigidly fitted on an outer periphery of the rotor and magnetized such that different poles alternate in a circumferential direction, an angle rigidly secured to respective foremost ends of the first and second outer magnetic pole parts and rotatably supporting an axial end of the lead screw shaft, a bobbin engaged with the first and second outer magnetic pole parts, the bobbin having a cover part covering an outer peripheral surface of the magnet, a first coil wound around the first outer magnetic pole part via the bobbin at an axial location between the magnet and the base, and a second coil wound around the second outer magnetic pole part via the bobbin at an axial location between the magnet and the base.

With the arrangement of the driving device according to the second aspect of the present invention, it is possible to obtain the same advantageous effects as provided by the first aspect of the invention.

Preferably, the rotor comprises a hollow cylindrical core.

More preferably, a construction of the lead screw shaft and the core is selected from the group consisting of a construction in which the lead screw shaft is formed integrally with the core and a construction in which the lead screw shaft and the core are formed as separate members.

Also preferably, the driving device further comprises a rack meshed with the lead screw shaft for axial movement in accordance with rotation of the lead screw shaft, and a support member rigidly secured to the angle and rotatably supporting the rack.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

First, a description will be given of a stepping motor according to a first embodiment of the present embodiment.

Figure 1:
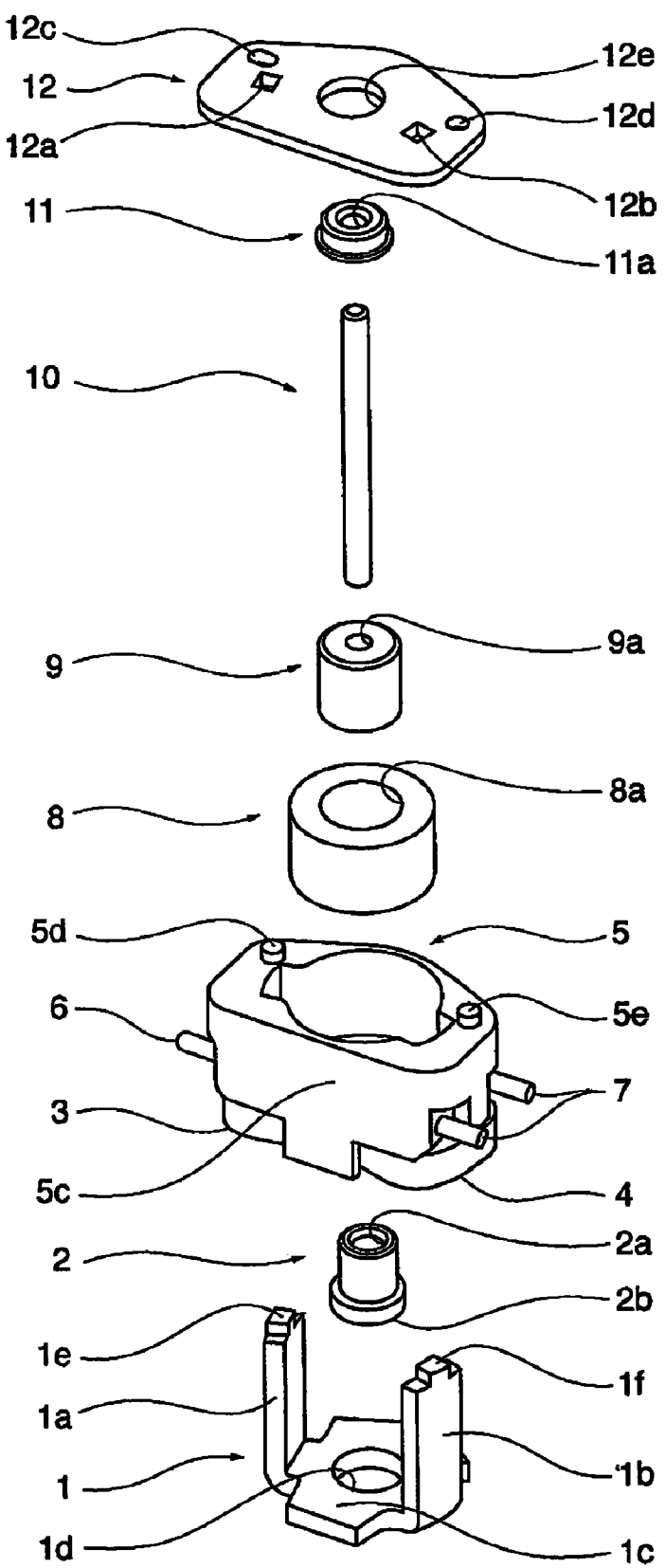
FIG. 1 is an exploded perspective view of a stepping motor according to a first embodiment of the present invention.
Figure 2:
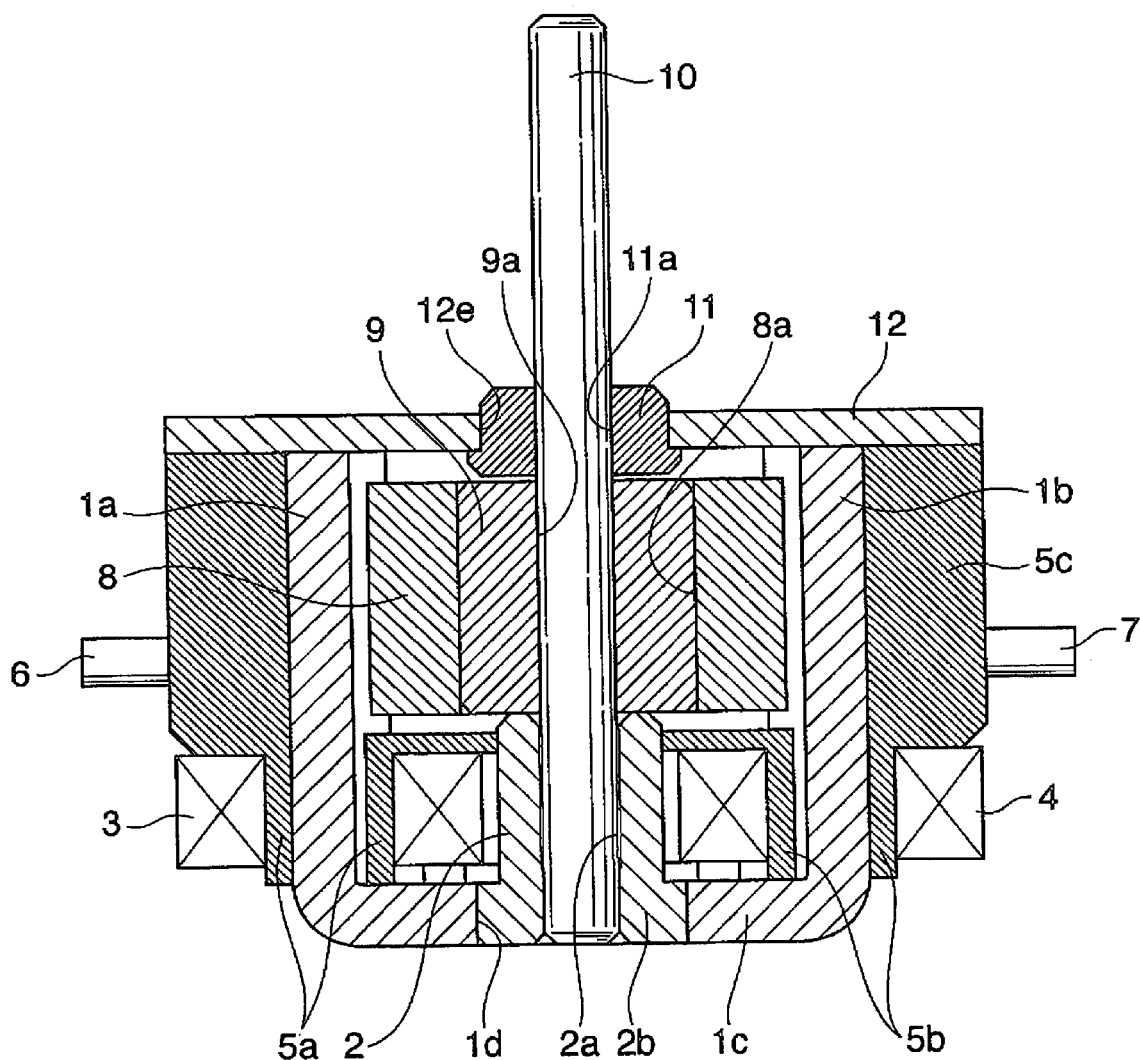
FIG. 2 is a longitudinal cross-sectional view of the stepping motor shown in FIG. 1, illustrating the internal construction thereof in an assembled state.

FIG. 1 is an exploded perspective view of the stepping motor according to the first embodiment, and FIG. 2 is a longitudinal cross-sectional view of the stepping motor shown in FIG. 1, illustrating the internal construction thereof in an assembled state.

As shown in FIGS. 1 and 2, the stepping motor is comprised of a stator 1, a first bearing 2, a second bearing 11, a first coil 3, a second coil 4, a bobbin 5, a magnet 8, a core 9, a rotary shaft 10, and a top plate 12.

The stator 1 is formed of a soft magnetic material, and is comprised of a first outer magnetic pole part 1a, a second outer magnetic pole part 1b, a plate part 1c, a hole 1d, and projections 1e and 1f. The plate part 1c is in the form of a plate having a generally inverted V shape with an opening angle of θ (see FIG. 3) in plan view, and has a central portion thereof formed with the hole 1d in which the first bearing 2 is fitted. The first outer magnetic pole part 1a and the second outer magnetic pole part 1b each have a comb-tooth shape and are formed integrally with the plate part 1c by being simply bent upward from opposite ends of the plate part 1c such that they extend parallel with the rotary shaft 10 constructing a rotor. The projection 1e is integrally formed at the foremost end of the first outer magnetic pole part 1a, and the projection 1f at the foremost end of the second outer magnetic pole part 1b.

Differently from the above described stator in the first prior art, the stator 1 has the first outer magnetic pole part 1a and the second outer magnetic pole part 1b formed integrally with the plate part 1c. This reduces a mutual positional error between the first outer magnetic pole part 1a and the second outer magnetic pole part 1b, whereby variation in the performance of the assembled stepping motor can be minimized.

The first bearing 2 is formed of a soft magnetic material into a hollow cylindrical shape. The first bearing 2 has a shaft hole 2a formed in the central portion thereof, and includes a fixing part 2b formed at one axial end. The rotary shaft 10 is fitted in the shaft hole 2a, and the fixing part 2b is fitted in the hole 1d of the stator 1, whereby the first bearing 2 supports the rotary shaft 10 such that the rotary shaft 10 can rotate.

The second bearing 11 is formed into an annular shape, and has a shaft hole 11a formed in the central portion thereof. The rotary shaft 10 is fitted in the shaft hole 11a, whereby the second bearing 11 rotatably supports the rotary shaft 10.

As shown in FIG. 2, the bobbin 5 is comprised of a first bobbin part 5a, a second bobbin part 5b, a cover part 5c, and dowels 5d and 5e. The cover part 5c is shaped such that the first outer magnetic pole part 1a and the second outer magnetic pole part 1b can be fitted therein. The cover part 5c is placed on the upper surface of the plate part 1c of the stator 1 to cover the outer peripheral surface of the magnet 8 and provide part of the appearance of the stepping motor.

The first bobbin part 5a around which the first coil 3 is wound is formed integrally with the cover part 5c. Further, the first bobbin part 5a is formed therein with a cutout through which is fitted a portion of the first outer magnetic pole part 1a axially adjacent to the plate part 1c. The second bobbin part 5b around which the second coil 4 is wound is formed integrally with the cover part 5c. Further, the second bobbin part 5b is formed therein with a cutout through which is fitted a portion of the second outer magnetic pole part 1b axially closer to the plate part 1c.

Two terminal pins 6, only one of which is shown, to which respective coil terminals of the first coil 3 are bound (connected) and two terminal pins 7 to which respective coil terminals of the second coil 4 are bound (connected) project outward from the longitudinal opposite ends of the cover part 5c of the bobbin 5. Further, the two dowels 5d and 5e for use in positioning the top plate 12 project upward from the upper surface of the cover part 5c of the bobbin 5.

The first coil 3 is wound around the first bobbin part 5a at an axial location between the magnet 8 and the plate part 1c of the stator 1 on the side toward the outer periphery of the first outer magnetic pole part 1a. The coil terminals on the opposite ends of the first coil 3 are bound to the respective two terminal pins 6 projecting from the bobbin 5, whereby the first coil 3 is made electrically continuous. With this arrangement, when the first coil 3 is energized, the first outer magnetic pole part 1a of the stator 1 is magnetized.

The second coil 4 is wound around the second bobbin part 5b at an axial location between the magnet 8 and the plate part 1c on the side toward the outer periphery of the second outer magnetic pole part 1b. The coil terminals on the opposite ends of the second coil 4 are bound to the respective two terminal pins 7 projecting from the bobbin 5, whereby the second coil 4 is made electrically continuous. With this arrangement, when the second coil 4 is energized, the second outer magnetic pole part 1b of the stator 1 is magnetized.

The first and second coils 3 and 4 are arranged adjacent to the upper surface of the plate part 1c of the stator 1, and the rotary shaft 10 and the first bearing 2 are arranged adjacent to each other between the first and second coils 3 and 4. This arrangement makes it possible to make the axial length of the stepping motor shorter, as compared with the arrangement in the first prior art in which the two coils and the magnet are arranged in the axial direction of the motor, with the gaps between the respective coils and the magnet.

The magnet 8 is formed into a hollow cylindrical shape having a bore part 8a in which the core 9 can be fitted. The magnet 8 is circumferentially divided into n sections (the number of the magnetized sections: n) (6 sections in the present embodiment (the number of magnetized sections: 6)), which are magnetized such that they have S and N poles alternately (see FIG. 3). The inner peripheral surface of the magnet 8 has a magnetic distribution weaker than the outer peripheral surface of the same, or not magnetized at all, or magnetized such that each magnetized section has a pole opposite to that of the outer peripheral surface of the magnetized section (i.e. when the outer peripheral surface of a magnetized section is S-magnetized, the inner peripheral surface of the same is N-magnetized).

The core 9 is formed of a soft magnetic material into a hollow cylindrical shape, and has a hole 9a in which the rotary shaft 10 can be fitted. The core 9 is fixed to the bore part 8a of the magnet 8 e.g. by bonding. The magnet 8 and the core 9 have the same size in the axial direction, and are rigidly secured to each other such that the axial ends of the two are flush with each other.

The rotary shaft 10 is formed of a soft magnetic material. The rotary shaft 10 is inserted and fixed in the shaft hole 2a of the first bearing 2, the hole 9a of the core 9, and the shaft hole 11a of the second bearing 11, and rotatably supported by the first bearing 2 and the second bearing 11. Further, it is possible to fix transmitting member such as a gear lever screw, not shown, on the foremost end portion of the rotary shaft 10 axially projecting outward from a portion thereof supported by the second bearing 11. This enables rotational output from the rotary shaft 10 to be obtained via the transmitting member.

The core 9 and the rotary shaft 10 form a rotor. The core 9 forming the rotor has its position restricted by the first bearing 2 and the second bearing 11, with predetermined gaps, whereby the rotor is positioned in the axial direction of the stepping motor.

Although in the present embodiment, the core 9 and the rotary shaft 10 as separate members are joined into one piece, they may be integrally formed as a one-piece member. In the case where the core 9 and the rotary shaft 10 are separately formed, it is possible to form the rotary shaft 10 using a material, such as SUS, which is high in strength and excellent in wear resistance, and form the core 9 using a soft magnetic material, such as SUY, which is excellent in magnetic efficiency. On the other hand, in the case where the core 9 and the rotary shaft 10 are integrally formed, it is possible not only to reduce manufacturing costs by reducing the number of component parts, but also to enhance accuracy in coaxial positioning of the core 9 and the rotary shaft 10.

The top plate 12 is in the form of a flat plate, and is formed with projection-receiving holes 12a and 12b, positioning holes 12c and 12d, and a bearing-receiving hole 12e. The projection 1e projecting from the foremost end of the first outer magnetic pole part 1a of the stator 1 and the projection 1f projecting from the foremost end of the second outer magnetic pole part 1b are inserted into the projection-receiving holes 12a and 12b, respectively, and fixed therein by laser welding or caulking. The dowels 5d and 5e of the bobbin 5 are fitted in the positioning holes 12c and 12d, respectively. Thus, the bobbin 5 is positioned on the top plate 12. The second bearing 11 is inserted and fixed in the bearing-receiving hole 12e.

In the present embodiment, the first and second outer magnetic pole parts 1a and 1b of the stator 1 are opposed to the outer peripheral surface of the magnet 8, with a predetermined gap maintained between the first and second outer magnetic pole parts 1a and 1b and the outer peripheral surface of the magnet 8. A portion of the core 9 opposed to the first outer magnetic pole part 1a, the rotary shaft 10, and the first bearing 2 form a first inner magnetic pole part. Similarly, a portion of the core 9 opposed to the second outer magnetic pole part 1b, the rotary shaft 10, and the first bearing 2 form a second inner magnetic pole part.

With this arrangement, by energizing the first coil 3 the first outer magnetic pole part 1a and the first inner magnetic pole part are magnetized to have opposite polarities, whereby a magnetic flux passing through the magnet 8 is generated between the two pole parts to cause the magnetic flux to effectively act on the magnet 8. Similarly, by energizing the second coil 4, the second outer magnetic pole part 1b and the second inner magnetic pole part are magnetized to have opposite polarities, whereby a magnetic flux passing through the magnet 8 is generated between the two pole parts to cause the magnetic flux to effectively act on the magnet 8.

Further, in the present embodiment, since it is not required to provide a gap between the core 9 serving to form the inner magnetic pole parts within the magnet 8 and the inner peripheral surface of the magnet 8, the gap between the first outer magnetic pole part 1a and the core 9 and the gap between the second outer magnetic pole part 1b and the core 9 can be reduced. This makes it possible to reduce the magnetic resistance of a magnetic circuit formed by the first coil 3, the first outer magnetic pole part 1a, and the first inner magnetic pole part, and that of a magnetic circuit formed by the second coil 4, the second outer magnetic pole part 1b, and the second inner magnetic pole part, thereby enhancing the output power of the stepping motor.

Furthermore, in the present embodiment, since the first inner magnetic pole part and the second inner magnetic pole part are formed by the core 9, the rotary shaft 10, and the first bearing 2, the rotor also plays the role of the inner magnetic pole parts, which contributes to reduction of manufacturing costs of the stepping motor. Moreover, since the stator 1 is formed simply by bending the first outer magnetic pole part 1a and the second outer magnetic pole part 1b in a direction perpendicular to the plate part 1c, it is possible to easily manufacture the stator at reduced manufacturing costs.

In contrast, in the first prior art, the first stator and the second stator are each required to have the inner magnetic pole parts thereof formed integrally with the outer magnetic pole parts. However, it is difficult to form the inner magnetic pole parts and the outer magnetic pole parts as parts of the same component. For example, they can be formed by metal injection molding, but this causes an increase in manufacturing costs. To integrally make the inner magnetic pole parts and the outer magnetic pole parts by press working is more difficult as the one-piece component is smaller, compared with the case of making a component forming only the outer magnetic pole parts made. Further, if the inner magnetic pole part and the outer magnetic pole parts are separately made and then integrally secured to each other by caulking, welding, or bonding, the manufacturing costs increase.

Further, in the present embodiment, since the magnet 8 is rigidly fitted on the core 9 as shown in FIG. 2, the mechanical strength of the magnet 8 is larger than that of the magnet in the first prior art. Further, the core 9 acts as a so-called back metal for reducing the magnetic resistance between the S poles and the N poles appearing in the inner periphery of the magnet 8. Therefore, the permeance coefficient of the magnetic circuit is set to a high value, so that even when the stepping motor is used under a high-temperature environment, there occurs less magnetic degradation due to demagnetization.

In the first prior art, it is required not only to assemble the stepping motor such that the gaps between the outer periphery of the magnet and the outer magnetic pole parts are maintained with high accuracy, but also to position the inner magnetic pole parts opposed to the inner periphery of the magnet, with the predetermined gaps maintained between the inner magnetic pole parts and the magnet. For this reason, there is a higher possibility that the gaps cannot be properly provided due to variations in the dimensional accuracy of parts and poor assembly accuracy, which causes abutment of the inner magnetic pole parts against the magnet, or other like defects.

In contrast, in the present embodiment, it suffices to control only the gaps between the outer periphery of the magnet 8 and the outer magnetic pole parts, which facilitates assembly of the parts of the stepping motor.

Furthermore, the stepping motor according to the first prior art is required to be configured such that the inner magnetic pole parts are not brought into contact with a portion connecting between the magnet and the output shaft, and hence the stepping motor cannot have a sufficient length in the axial direction in which the inner magnetic pole parts and the magnet are opposed to each other.

In contrast, in the present embodiment, since the rotor also plays the role of the inner magnetic pole parts, the stepping motor can have a sufficient length in the axial direction in which the inner magnetic pole parts and the magnet 8 are opposed to each other. This makes it possible to make effective use of the first and second outer magnetic pole parts 1*a* and 1*b* of the stator 1 and the magnet 8, thereby enhancing the output power of the stepping motor.

Further, in the present embodiment, the first and second outer magnetic pole parts 1*a* and 1*b* of the stator 1 each have a comb-tooth shape extending in the axial direction of the stepping motor, so that the outermost diameter of the stepping motor (L1 in FIG. 3) can be minimized.

If the outer magnetic pole parts are formed by a stator plate extending in the radial direction of the magnet, for example, it is required to form the magnet having a flat extending configuration, and wind the coils in the radial direction. For this reason, although the stepping motor can have a reduced axial length, its outermost diameter is inevitably increased.

In contrast, in the present embodiment, the outermost diameter of the stepping motor (L1 in FIG. 3) is determined by the diameter of the magnet 8, the thickness of the first and second outer magnetic pole parts 1*a* and 1*b*, and the winding width of the first and second coils 3 and 4. In this case, one side portion (first bearing-side portion) of the winding of each of the first and second coils 3 and 4 is positioned at substantially the same radial location as the magnet 8 is (see FIG. 2), which makes it possible to minimize the outermost diameter of the stepping motor.

Further, in the present embodiment, since the first and second outer magnetic pole parts 1*a* and 1*b* of the stator 1 are each configured to have the comb-tooth shape extending in the axial direction of the stepping motor, the first coil 3, the second coil 4, the magnet 8, and the rotor formed by the core 9 and the rotary shaft 10 can be all mounted from one direction (from the top side to the bottom side as viewed in FIG. 1), which ensures ease of assembly work.

Furthermore, in the present embodiment, the bobbin 5 has both the first coil 3 and the second coil 4 wound therearound, and also serves as a cover for covering the outer peripheral surface of the magnet 8, so that it is possible to reduce the number of component parts and manufacturing costs in comparison with the case where the first and second coils are wound around different bobbins, respectively, or the case where a cover is additionally provided.

In the second prior art, the stator part, the bobbin part, and the cover part having the hole for holding the one bearing at a location corresponding to the one end surface of the stator part are integrally formed of a synthetic resin, and hence the cover part is formed integrally with the bobbin part, as in the present embodiment. However, it is required to use an insert molding machine as an apparatus for integrally forming the stator part, the bobbin part, and the cover part, and therefore investment in equipment significantly increases, which affects manufacturing costs. In short, the manufacturing of the stepping motor can only be practical for mass production.

In contrast, in the present embodiment, the first bearing 2 is rigidly mounted in the stator 1, so that it is not required to form a stator part integrally with a cover part having a hole for holding a bearing, as in the second prior art, so as to enhance accuracy in positioning the bearing in the stator part. Therefore, it is not necessary to use an insert molding machine, which leads to reduction of manufacturing costs.

Further, in the second prior art, since the magnet is disposed in the bore part of the stator unit including the coils, the outer diameter of the magnet has to be smaller than that of the stepping motor. As a consequence, if the outer diameter of the stepping motor is reduced, that of the magnet is inevitably reduced, which causes significant reduction of the output power of the stepping motor.

In contrast, in the present embodiment, the outer diameter of the stepping motor (L2 in FIG. 3) is determined only by the diameter of the magnet 8 and the thickness of the cover part 5*c* of the bobbin 5, so that the outer diameter of the magnet 8 can be considerably approximated to that of the stepping motor. This is advantageous in reduction of the outer diameter of the stepping motor.

Further, in the present embodiment, since the rotor (the core 9 and the rotary shaft 10) is supported by the first bearing 2 mounted in the stator 1 and the second bearing 11 mounted in the top plate 12 fixed to the stator 1, it is possible to minimize coaxial deviation between the two support members. This contribute to uniformity of the gaps between the outer peripheral surface of the magnet 8 and the inner peripheral surface of the first and second outer magnetic pole parts 1*a* and 1*b*, and makes it possible to stabilize the rotation of the stepping motor.

Next, other characterizing features and operation of the stepping motor according to the present embodiment will be described with reference to FIGS. 3 to 6.

First, a description will be given of the other characterizing features of the stepping motor.

Figure 3:
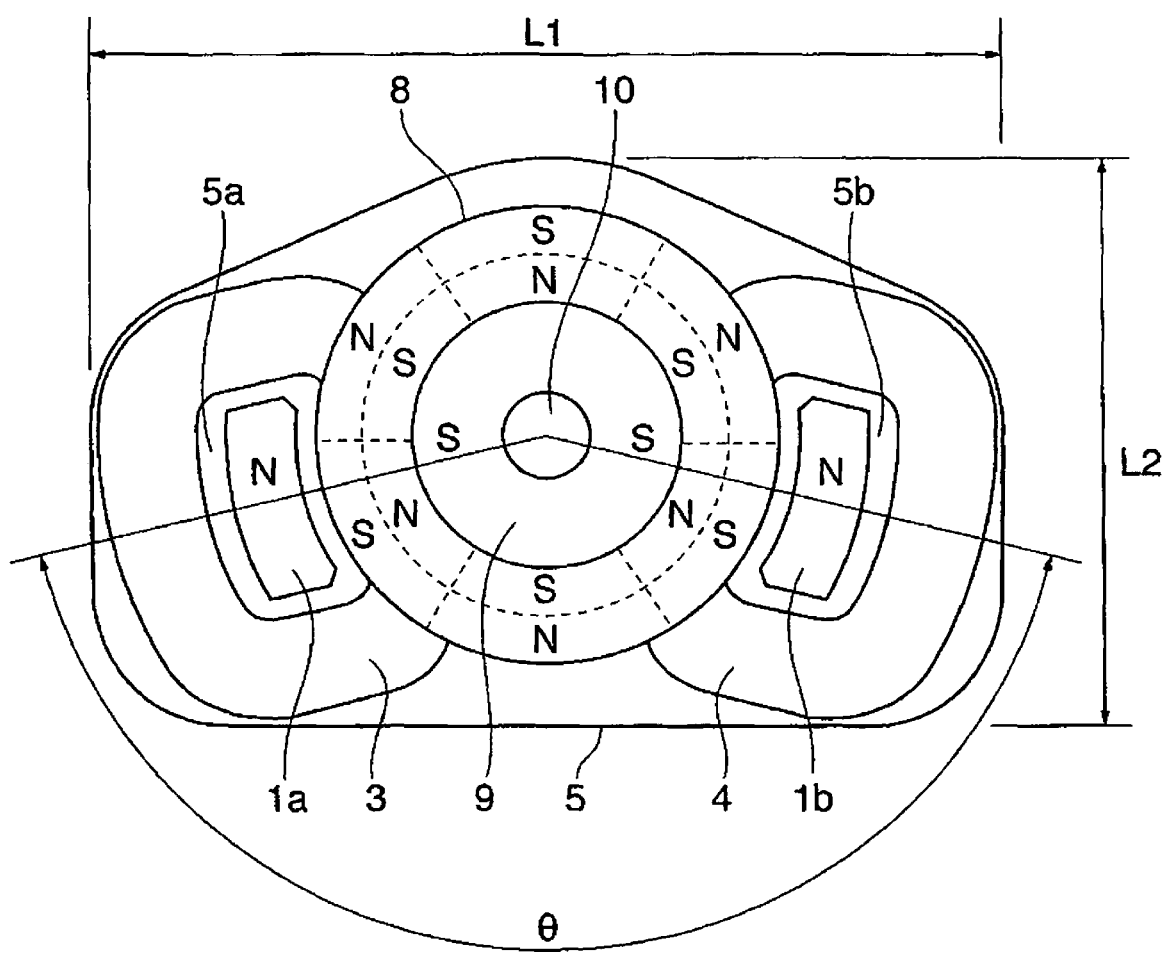
FIG. 3 is a top view of the stepping motor shown in FIG. 1, in a first energized state.
Figure 4:
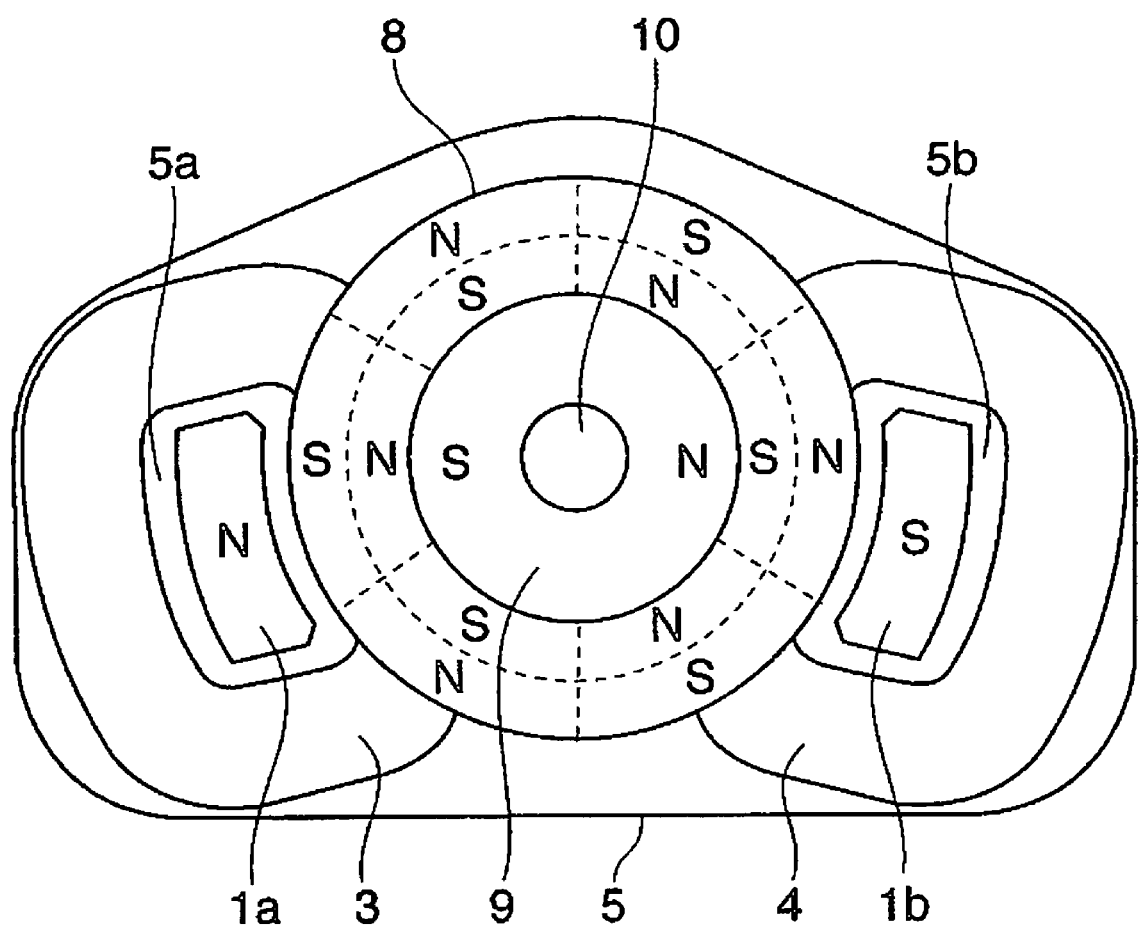
FIG. 4 is a top view of the stepping motor shown in FIG. 1, in a second energized state.
Figure 5:
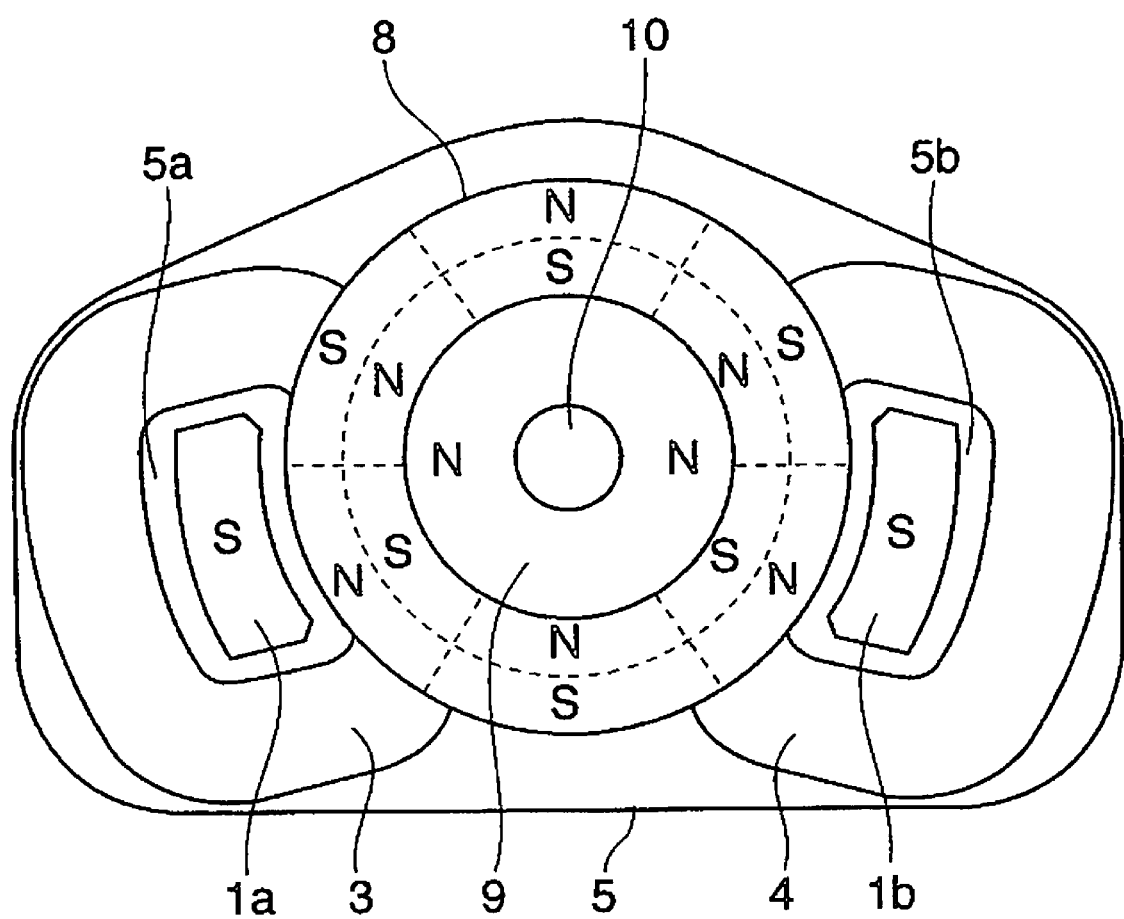
FIG. 5 is a top view of the stepping motor shown in FIG. 1, in a third energized state.
Figure 6:
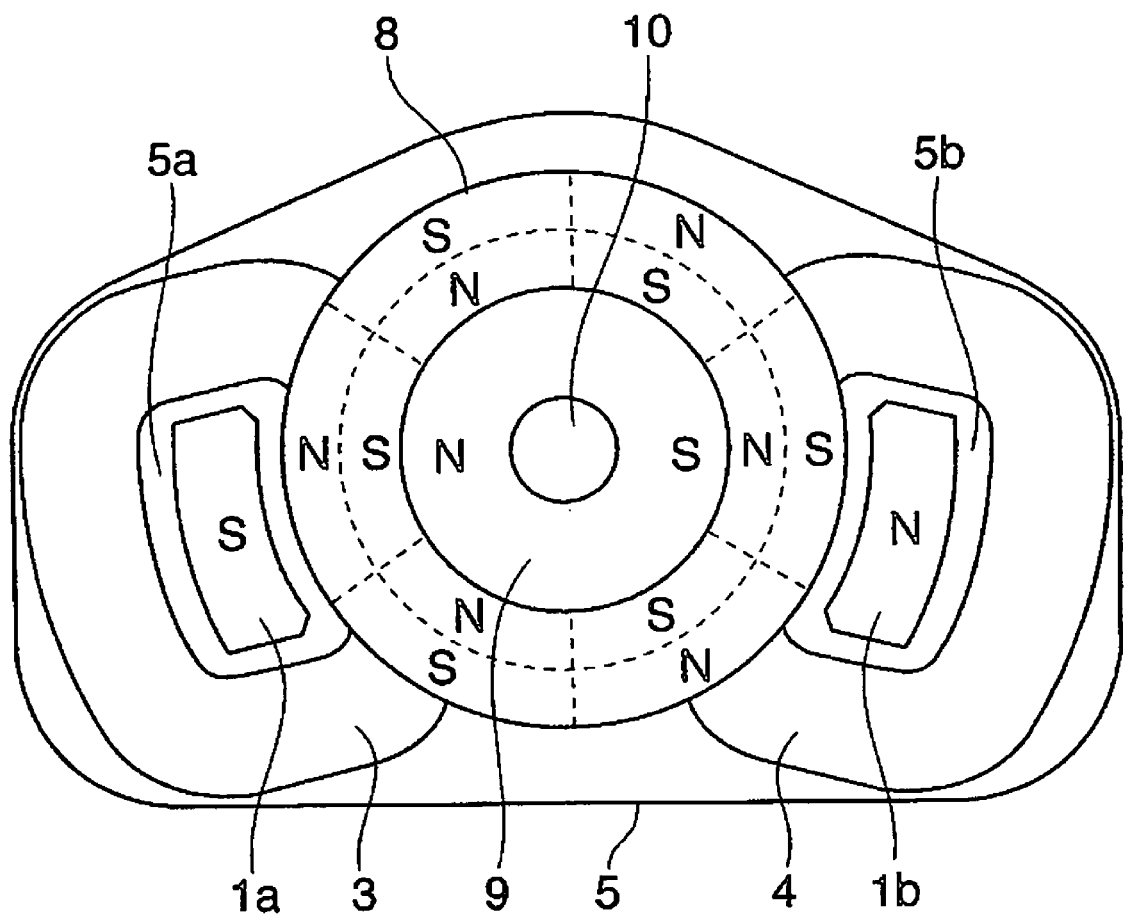
FIG. 6 is a top view of the stepping motor shown in FIG. 1, in a fourth energized state.

FIG. 3 is a top view of the stepping motor in a first energized state. FIG. 4 is a top view of the stepping motor in a second energized state. FIG. 5 is a top view of the stepping motor in a third energized state. FIG. 6 is a top view of the stepping motor in a fourth energized state.

As shown in FIGS. 3 to 6, the magnet 8 has its outer peripheral surface and inner peripheral surface circumferentially divided at equal angle intervals into a plurality of sections (six sections in the present embodiment), which are magnetized such that they have S and N poles alternately. Sections magnetized to have S poles on the outer peripheral surfaces thereof have N poles on the inner peripheral surfaces thereof, while sections magnetized to have N poles on the outer peripheral surfaces thereof have S poles on the inner peripheral surfaces thereof.

Further, as shown in FIG. 3, the first and second outer magnetic pole parts 1*a* and 1*b* of the stator 1 are disposed in respective positions having a phase difference of $\theta$ degrees about the rotational center of the magnet 8. The phase difference of $\theta$ degrees is calculated as $(180°-180°/n)$ (n=the number of the magnetized sections). In the present embodiment, since n is six, $\theta$ is equal to 150. The dimension L2 (minimum outer diameter of the stepping motor) in FIG. 3 can be reduced by thus setting the $\theta$ degrees to $(180°-180°/n)$.

As described above, the first and second outer magnetic pole parts 1*a* and 1*b* of the stator 1 are formed such that they are opposed to the outer peripheral surface of the magnet 8 over respective angle ranges different from each other (i.e. in respective positions having a phase difference of $\theta$ degrees) on an identical plane perpendicular to the axial direction of the magnet 8. This makes it possible to reduce the axial dimension of the magnet 8, thereby contributing to reduction of the axial dimension of the stepping motor.

One of the major characterizing features of the stepping motor constructed as above is that magnetic fluxes act on each part of the outer peripheral surface of the magnet 8 as follows: In accordance with rotation of the magnet 8, a magnetic flux from the first outer magnetic pole part 1*a* magnetized by the first coil 3 and a magnetic flux from the second outer magnetic pole part 1*b* magnetized by the second coil 4 alternately act on the part of the magnet 8. Since the first magnetic pole part 1*a* and the second magnetic pole part 1*b* cause the respective magnetic fluxes to act on the same part of the magnet 8, the performance of the stepping motor can be stabilized without being adversely affected e.g. by variation in magnetization.

Next, a description will be given of the operation of the stepping motor.

In a state shown in FIG. 3, the first coil 3 is energized in the normal direction, whereby the first outer magnetic pole part 1a is N-magnetized, and a first inner magnetic pole part (a part of the core 9 opposed to the first outer magnetic pole part 1a) is S-magnetized. Similarly, the second coil 4 is energized in the normal direction, whereby the second outer magnetic pole part 1b is N-magnetized, and a second inner magnetic pole part (a part of the core 9 opposed to the second outer magnetic pole part 1b) is S-magnetized (first energized state).

Then, only the energizing direction of the second coil 4 is switched from the state shown in FIG. 3 to the reverse direction, whereby the second outer magnetic pole part 1b is S-magnetized, and the second inner magnetic pole part is N-magnetized. This causes the magnet 8 to rotate clockwise through 30 degrees as shown in FIG. 4 (second energized state).

Further, only the energizing direction of the first coil 3 is switched from the state shown in FIG. 4 to the reverse direction, whereby the first outer magnetic pole part 1a is S-magnetized, and the first inner magnetic pole part is N-magnetized. This causes the magnet 8 to further rotate clockwise through 30 degrees as shown in FIG. 5 (third energized state).

Further, only the energizing direction of the second coil 4 is switched from the state shown in FIG. 5 to the normal direction, whereby the second outer magnetic pole part 1b is N-magnetized, and the second inner magnetic pole part is S magnetized. This causes the magnet 8 to further rotate clockwise through 30 degrees as shown in FIG. 6 (fourth energized state).

Then, similarly to the above, the directions of energization of the first coil 3 and the second coil 4 are sequentially switched, whereby the polarities of the first outer magnetic pole part 1a and the second outer magnetic pole part 1b are switched in respective different timings. This causes the magnet 8 to sequentially rotate to positions dependent on the energization phase.

As described above, according to the present embodiment, the first energized state is set by energizing the first coil 3 and the second coil 4 both in the normal direction. The second energized state is set by energizing the first coil 3 in the normal direction, and the second coil 4 in the reverse direction. The third energized state is set by energizing the first coil 3 and the second coil 4 both in the reverse direction. The fourth energized state is set by energizing the first coil 3 in the reverse direction, and the second coil 4 in the normal direction. Thus, the energized state is sequentially switched in the order of the first energized state, the second energized state, the third energized state, and the fourth energized state so as to keep the magnet 8 rotating.

The energized state may be switched as follows: A fifth energized state is set by energizing the first coil 3 and the second coil 4 both in the normal direction. A sixth energized state is set by energizing the first coil 3 in the normal direction, and deenergizing the second coil 4. A seventh energized state is set by energizing the first coil 3 in the normal direction, and the second coil 4 in the reverse direction. An eighth energized state is set by deenergizing the first coil 3, and energizing the second coil 4 in the reverse direction. Thus, the energized state may be sequentially switched in the order of the fifth energized state, the sixth energized state, the seventh energized state, and the eighth energized state. This causes the magnet 8 to sequentially rotate to positions dependent on the energization phase.

Next, a description will be given of phase relationship between the magnet 8, the first and the second outer magnetic pole parts 1a and 1b of the stator 1.

As described above, when the energized state is sequentially switched in the order of the first energized state, the second energized state, the third energized state, and the fourth energized state, the polarities of the first outer magnetic pole part 1a and the second outer magnetic pole part 1b are switched by alternately magnetizing the first outer magnetic pole part 1a and the second outer magnetic pole part 1b.

When the first outer magnetic pole part 1a is N-magnetized by energization of the first coil 3 in the normal direction in the state shown in FIG. 3, a rotational force acting in the clockwise direction, as viewed in FIG. 3, is generated in the magnet 8 to radially align the center of an associated magnetized section (S pole) of the magnet 8 with the center of the first outer magnetic pole part 1a. At the same time, the second coil 4 is also energized in the normal direction, whereby the second outer magnetic pole part 1b is N-magnetized, and a rotational force acting in the counterclockwise direction, as viewed in FIG. 3, is generated in the magnet 8 to radially align the center of an associated magnetized section (S pole) of the magnet 8 with the center of the second outer magnetic pole part 1b.

During energization of the two coils, the magnet 8 is standing still in a state where the rotational forces from the two coils are balanced. FIG. 3 shows this state. When the amounts of current supplied to the respective two coils are equal, the phase difference between the center of the first outer magnetic pole part 1a and the center of the associated magnetized section (S pole) of the magnet 8 and the phase difference between the center of the second outer magnetic pole part 1b and the center of the associated magnetized section (S pole) of the magnet 8 are both equal to approximately 15 degrees.

When the energizing direction of the second coil 4 is switched from the state shown in FIG. 3 to the reverse direction, the second outer magnetic pole part 1b is S-magnetized, and a rotational force acting in the clockwise direction, as viewed in FIG. 3, is generated in the magnet 8 to radially align the center of an associated magnetized section (N pole) of the magnet 8 with the center of the second outer magnetic pole part 1b. At this time, the first coil 3 is kept energized in the normal direction. As a consequence, a rotational force acting in the clockwise direction, as viewed in FIG. 3, is generated in the magnet 8 to radially align the center of an associated magnetized section (S pole) of the magnet 8 with the center of the first outer magnetic pole part 1a. This causes the magnet 8 to start clockwise rotation from the state shown in FIG. 3.

When the magnet 8 rotates clockwise through approximately 15 degrees from the state shown in FIG. 3, the center of the first outer magnetic pole part 1a and the center of the associated magnetized section (S pole) of the magnet 8 are radially aligned with each other. At this time, the center of the second outer magnetic pole part 1b is radially opposed to the boundary between magnetized sections (S and N poles) of the magnet 8, and in this state, a rotational force for further rotating the magnet 8 clockwise has been generated. Then, when the magnet 8 further rotates clockwise through approximately 15 degrees from the state (i.e. when the magnet 8 rotates clockwise through approximately 30 degrees from the state shown in FIG. 3), the magnet 8 is brought into a state where the rotational forces from the two coils are balanced, and stops in the position. FIG. 4 shows this state.

When the energizing direction of the first coil 3 is switched from the state shown in FIG. 4 to the reverse direction, the first outer magnetic pole part 1a is S-magnetized, and a rotational force acting in the clockwise direction, as viewed in FIG. 4, is generated in the magnet 8 to radially align the center of an associated magnetized section (N pole) of the magnet 8 with the center of the first outer magnetic pole part 1a. At this time, the second coil 4 is kept energized in the reverse direction. As a consequence, a rotational force acting in the clockwise direction, as viewed in FIG. 4, is generated in the magnet 8 to radially align the center of an associated magnetized section (N pole) of the magnet 8 with the center of the second outer magnetic pole part 1b. This causes the magnet 8 to start clockwise rotation from the state shown in FIG. 4.

When the magnet 8 rotates clockwise through approximately 15 degrees from the state shown in FIG. 4, the center of the second outer magnetic pole part 1b and the center of the associated magnetized section (N pole) of the magnet 8 are radially aligned with each other. At this time, the center of the first outer magnetic pole part 1a is radially opposed to the boundary between magnetized sections (S and N poles) of the magnet 8, and in this state, a rotational force for further rotating the magnet 8 clockwise has been generated. Then, when the magnet 8 further rotates clockwise through approximately 15 degrees from the state (i.e. when the magnet 8 rotates clockwise through approximately 30 degrees from the state shown in FIG. 4), the magnet 8 is brought into a state where the rotational forces from the two coils are balanced, and stops in the position. FIG. 5 shows this state.

When the energizing direction of the second coil 4 is switched from the state shown in FIG. 5 to the normal direction, the second outer magnetic pole part 1b is N-magnetized, and a rotational force acting in the clockwise direction, as viewed in FIG. 5, is generated in the magnet 8 to radially align the center of an associated magnetized section (S pole) of the magnet 8 with the center of the second outer magnetic pole part 1b. At this time, the first coil 3 is kept energized in the reverse direction. As a consequence, a rotational force acting in the clockwise direction, as viewed in FIG. 5, is generated in the magnet 8 to radially align the center of an associated magnetized section (N pole) of the magnet 8 with the center of the first outer magnetic pole part 1a. This causes the magnet 8 to start clockwise rotation from the state shown in FIG. 5.

When the magnet 8 rotates clockwise through approximately 15 degrees from the state shown in FIG. 5, the center of the first outer magnetic pole part 1a and the center of the associated magnetized section (N pole) of the magnet 8 are radially aligned with each other. At this time, the center of the second outer magnetic pole part 1b is radially opposed to the boundary between magnetized sections (S and N poles) of the magnet 8, and in this state, a rotational force for further rotating the magnet 8 clockwise has been generated. Then, when the magnet 8 further rotates clockwise through approximately 15 degrees from the state (i.e. when the magnet 8 rotates clockwise through approximately 30 degrees from the state shown in FIG. 5), the magnet 8 is brought into a state where the rotational forces from the two coils are balanced, and stops in the position. FIG. 6 shows this state.

As described above, according to the present embodiment, the magnet 8 is rigidly fitted on the rotor (the rotary shaft 10 and the core 9) disposed between the first and second outer magnetic pole parts 1a and 1b of the stator 1. This arrangement makes it possible to enhance the mechanical strength of the magnet 8 and cause the rotor to also serve as the inner magnetic pole part, and makes it unnecessary to form a gap between the magnet 8 and the inner magnetic pole part. As a result, magnetic resistance can be reduced, which contributes to enhancement of the output power of the stepping motor.

Further, in the present embodiment, the stepping motor is constructed such that its outer diameter can be determined only by the diameter of the magnet 8 and the thickness of the cover part 5c of the bobbin 5, and the first and second outer magnetic pole parts 1a and 1b of the stator 1 are each formed into the comb-tooth shape extending in the axial direction of the stepping motor. This makes it possible to minimize the outer diameter and axial length of the stepping motor, thereby reducing the size of the same.

Further, the length of the inner magnetic pole part formed by the part of the core 9 opposed to the first and second outer magnetic pole parts 1a and 1b, the rotary shaft 10, and the first bearing 2 is set to the same length as the axial length of the magnet 8, thereby enabling effective use of the first and second outer magnetic pole parts 1a and 1b and the magnet 8. This makes it easier to manufacture the stepping motor than in the case where the outer magnetic pole parts and the inner magnetic pole parts are joined or integrally formed.

Furthermore, in the present embodiment, it suffices to control only the gaps between the outer periphery of the magnet 8 and the outer magnetic pole parts, which makes it easier to assemble component parts constituting the stepping motor than in the prior art in which the gaps between the outer periphery of the magnet and the outer magnetic pole parts and the gaps between the inner periphery of the magnet and the inner magnetic pole parts are required to be secured. The simpler construction and the easier assembly also make it possible to reduce the fraction defective.

Moreover, since the bobbin 5 has both the first coil 3 and the second coil 4 wound therearound and also serves as a cover for covering the outer peripheral surface of the magnet 8, it is possible to reduce the number of component parts and manufacturing costs.

Further, since the rotor is supported by the first bearing 2 mounted in the stator 1 and the second bearing 11 mounted in the top plate 12 fixed to the stator 1, coaxial deviation between the two support members can be minimized. As a result, the gaps between the outer peripheral surface of the magnet and the inner peripheral surfaces of the respective first and second outer magnetic pole parts can be made uniform, which makes it possible to obtain stable rotation of the stepping motor.

In short, the present embodiment makes it possible to provide a low-cost and high-output stepping motor compact in size and reduced in axial length.

Next, a description will be given of a stepping motor according to a second embodiment of the present invention.

Figure 7:
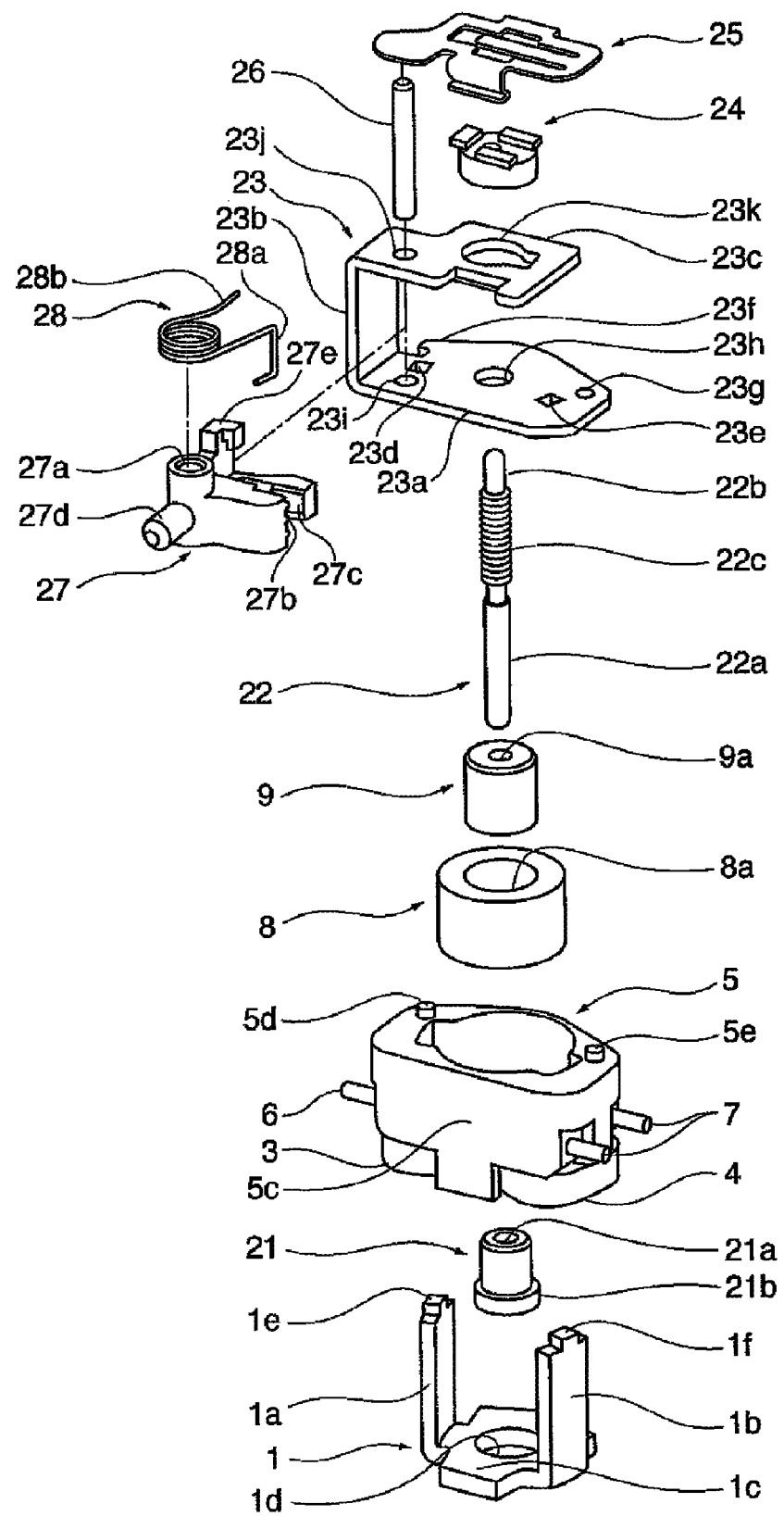
FIG. 7 is an exploded perspective view of a stepping motor according to a second embodiment of the present invention.
Figure 8:
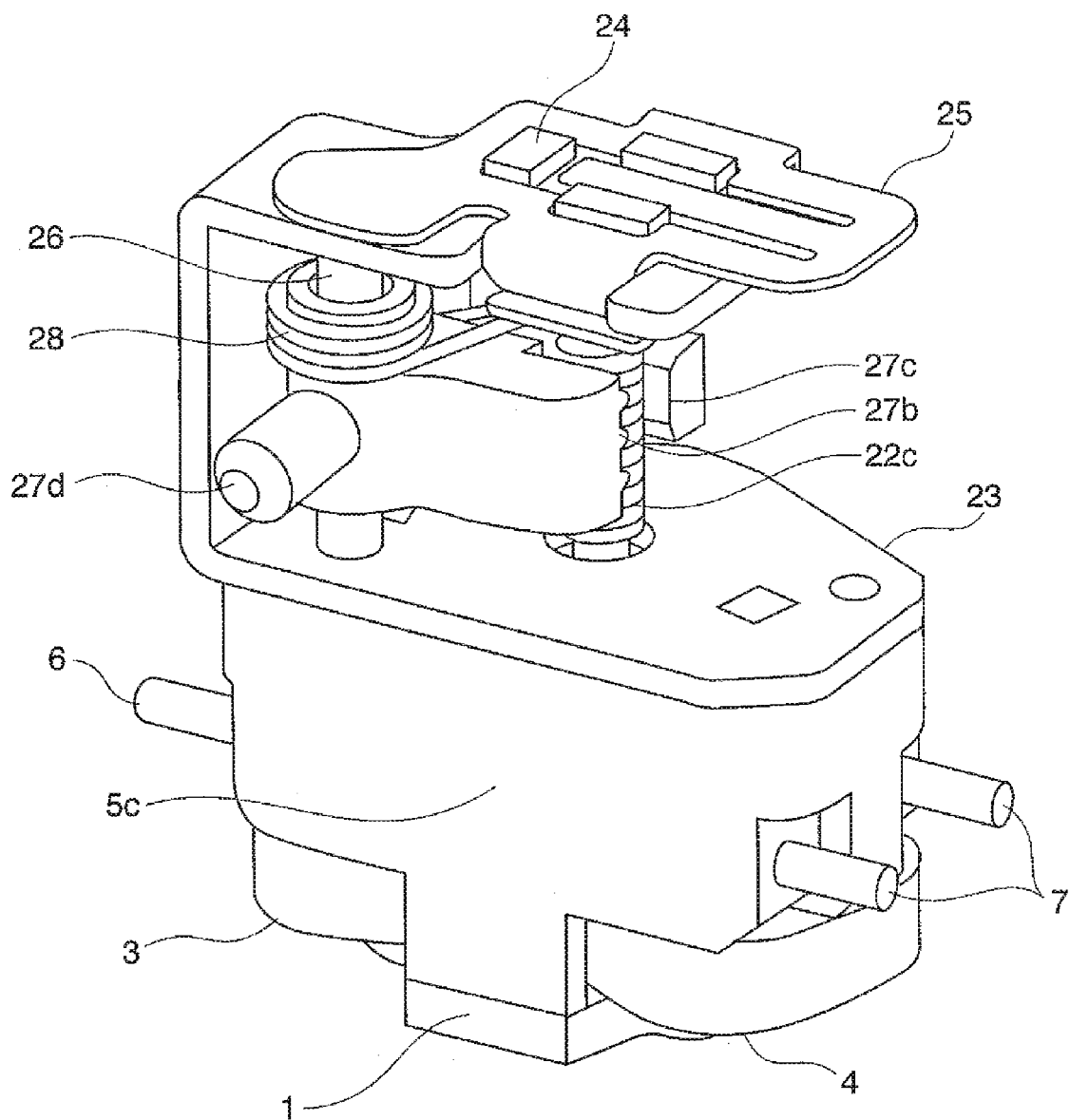
FIG. 8 is a perspective view showing the appearance of the stepping motor shown in FIG. 7, in an assembled state.

FIG. 7 is an exploded perspective view of the stepping motor according to the second embodiment. FIG. 8 is a perspective view of the appearance of the stepping motor in an assembled state, and FIG. 9 is a longitudinal cross-sectional view of the stepping motor, illustrating the internal construction thereof in the assembled state.

Figure 9:
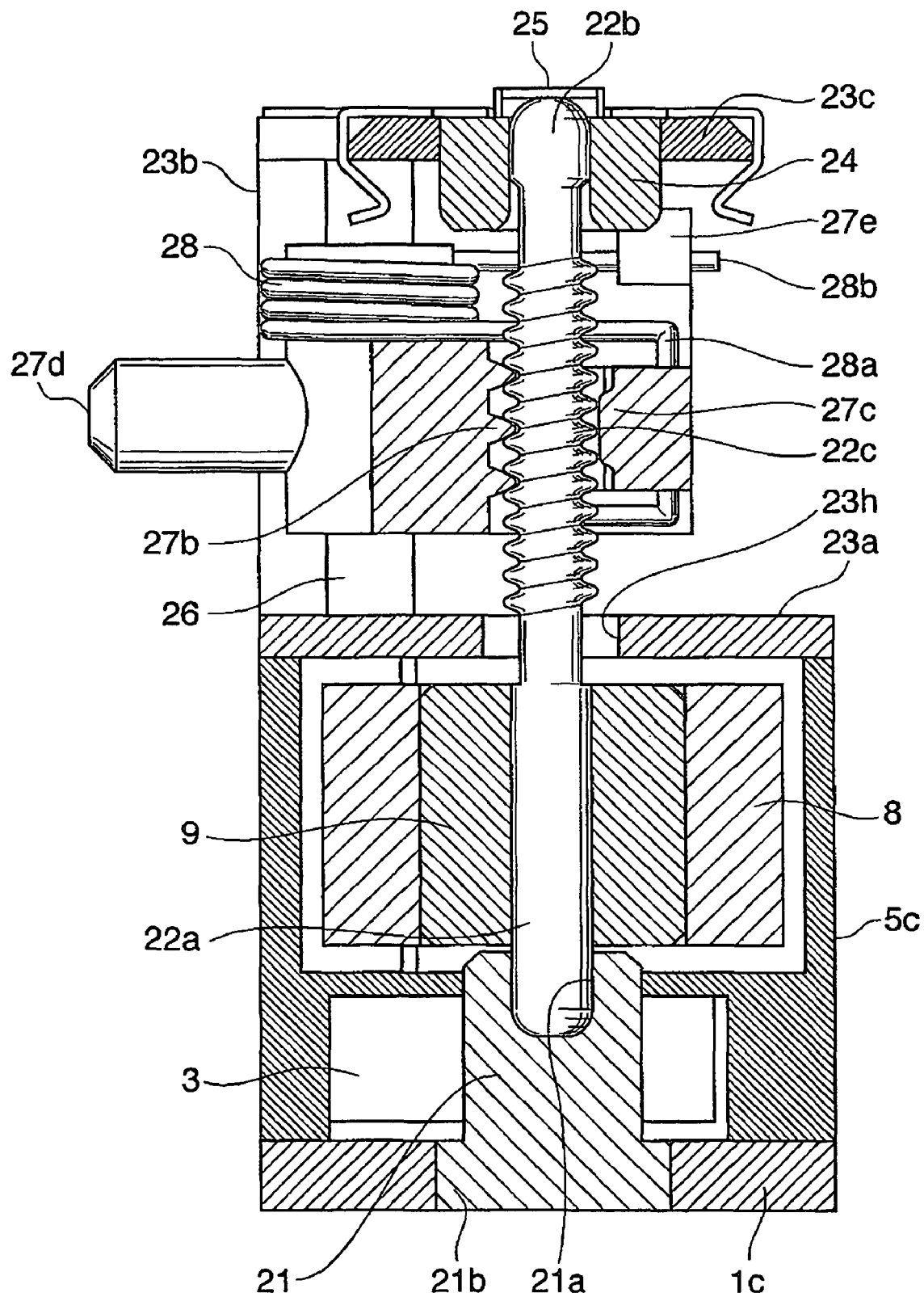
FIG. 9 is a longitudinal cross-sectional view of the stepping motor shown in FIG. 7, illustrating the internal construction thereof in the assembled state.
Figure 10:
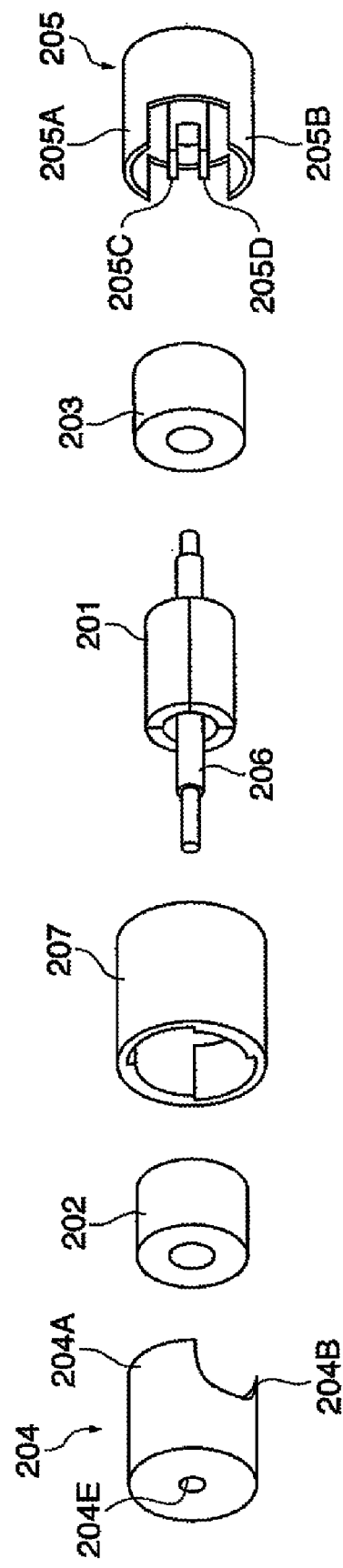
FIG. 10 is an exploded perspective view of a stepping motor according to a first prior art.
Figure 11:
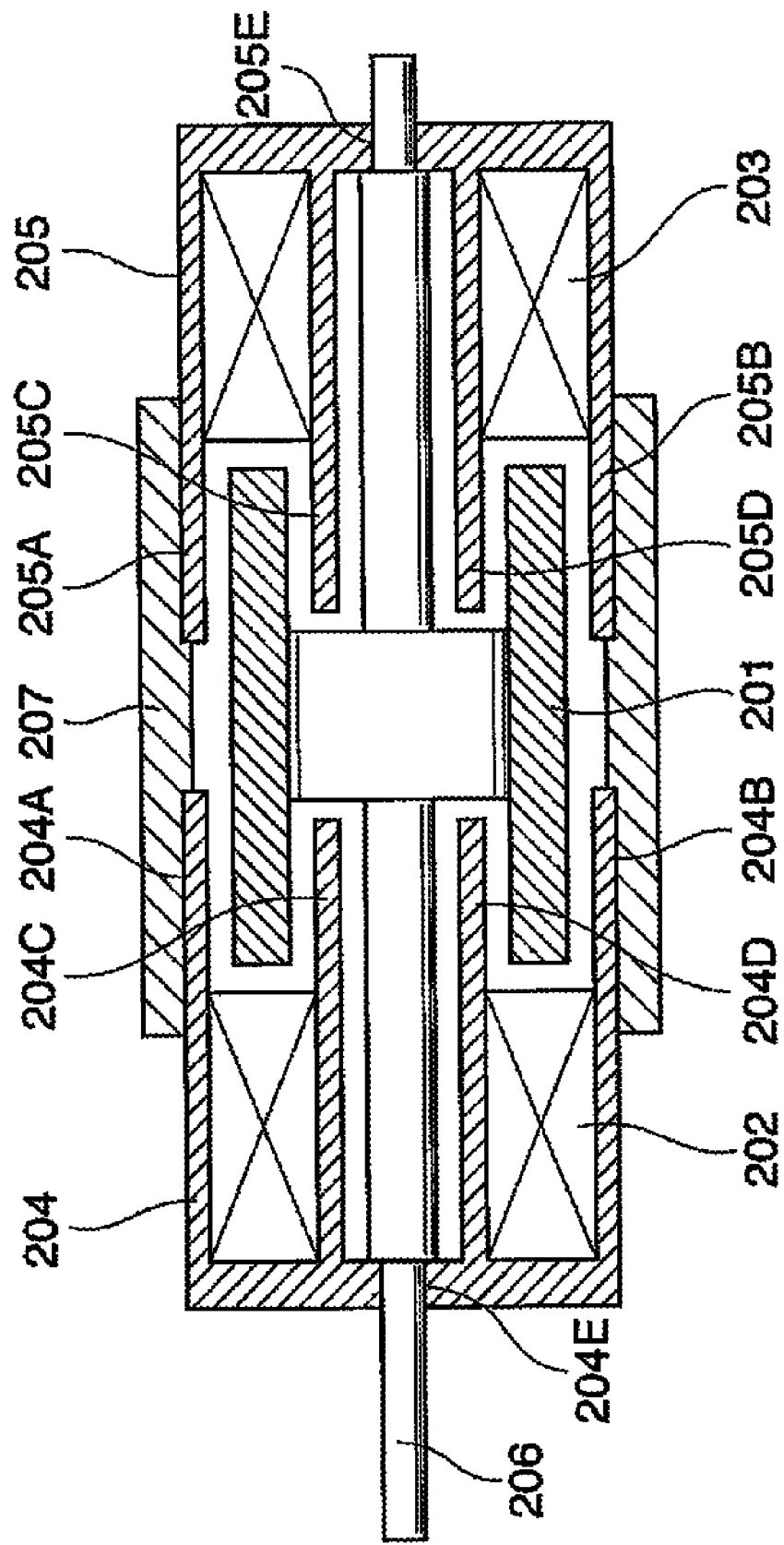
FIG. 11 is a longitudinal cross-sectional view of the stepping motor shown in FIG. 10, illustrating the internal construction thereof in an assembled state.

As shown in FIGS. 7 to 9, the stepping motor is comprised of the stator 1, a first bearing 21, a second bearing 24, the first coil 3, the second coil 4, the bobbin 5, the magnet 8, the core 9, a lead screw shaft 22, an angle 23, and a rack 27.

The present embodiment is distinguished from the above described first embodiment in that the lead screw shaft 22 is used as a rotary shaft of the stepping motor, and the angle 23 and the rack 27 are provided. The other component elements in the present embodiment are identical to the corresponding ones in the first embodiment (see FIG. 1), and therefore description thereof is omitted by designating the component elements with identical reference numerals. In the following, a description will be given of only different points from the first embodiment.

The first bearing 21 is formed of a soft magnetic material, and is disposed between the first coil 3 and the second coil 4 and rigidly fixed in the hole 1d of the stator 1 by press-fitting, caulking, or laser welding. The lead screw shaft 22 is rotatably supported by the first bearing 21.

The lead screw shaft 22 is formed of a soft magnetic material, and is comprised of a first shaft part 22a, a second shaft part 22b, and a male thread part 22c. The part of the first shaft part 22a except a foremost end is fitted and fixed in the hole 9a of the core 9, and the foremost end having a spherical surface (sphere R) shape is rotatably supported by the first bearing 21. The second shaft part 22b has a foremost end having a spherical surface (sphere R) shape, which is rotatably supported by the second bearing 24. The male thread part 22c is held in mesh with a projection 27b of the rack 27, described in detail hereinafter, to linearly move the rack 27 in the axial direction in accordance with rotation of the lead screw shaft 22.

The angle 23 is comprised of a top plate part 23a in the form of a flat plate, an arm part 23b, and a holding part 23c, all of which are integrally formed into a one-piece member. The top plate part 23a is formed with holes 23d and 23e, positioning parts 23f and 23g, and holes 23h, 23i, 23j, and 23k. The holding part 23c is formed with holes 23h and 23j.

The projection 1e projecting from the foremost end of the first outer magnetic pole part 1a and the projection 1f projecting from the foremost end of the second outer magnetic pole part 1b of the stator 1 are inserted into the holes 23d and 23e of the top plate part 23a, respectively, and fixed therein by laser welding or caulking. The arm part 23b is formed integrally with the top plate part 23a in a manner bent upward, as viewed in FIG. 7, and extending at the right angle from an end of the top plate part 23a (in parallel with the lead screw shaft 22 in the assembled state). The holding part 23c is formed integrally with the arm part 23b in a manner bent and extending at right angles from an end of the arm part 23b (in parallel with the top plate part 23a).

The top plate part 23a is rigidly secured to the stator 1 in a manner sandwiching the bobbin 5 between the stator 1 and the top plate part 23a itself. The dowels 5d and 5e of the bobbin 5 are fitted in the positioning parts 23f and 23g of the top plate part 23a, respectively, whereby the bobbin 5 is positioned on the top plate part 23a. The hole 23h is formed in an approximately central part of the top plate part 23a, and the diameter of the hole 23h is larger than the outer diameter of the male thread part 22c of the lead screw shaft 22.

Although in the present embodiment, the lead screw shaft 22 and the core 9 as separate members are joined into one piece, they may be integrally formed as a one-piece member. In the case where the lead screw shaft 22 and the core 9 are separately formed, it is possible to form the lead screw shaft 22 using a material, such as SUS, which is high in strength and excellent in wear resistance, and form the core 9 using a soft magnetic material, such as SUY, which is excellent in magnetic efficiency. On the other hand, in the case where the lead screw shaft 22 and the core 9 are integrally formed as a one-piece member, it is possible not only to reduce manufacturing costs by reducing the number of component parts, but also to enhance accuracy in coaxial positioning of the lead screw shaft 22 and the core 9.

The second bearing 24 is mounted in the hole 23k formed in the holding part 23c of the angle 23. The second shaft part 22b of the lead screw shaft 22 is rotatably supported by the second bearing 24.

A shaft presser spring 25 is mounted on the holding part 23c of the angle 23 to urge the sphere R-shaped foremost end of the second shaft part 22b of the lead screw shaft 22 downward, as viewed in FIGS. 7 to 9, in the axial direction, as well as to serve as a stopper portion for preventing a rack support bar 26 from falling off.

The rack support bar 26 is mounted in the angle 23 via the hole 23i formed in the top plate part 23a and the hole 23j formed in the holding part 23c, so as to rotatably support the rack 27.

The rack 27 is comprised of a shaft hole 27a, a projection 27b, an arm part 27c, an output part 27d, and a spring hook part 27e. The rack support bar 26 is inserted and fitted in the shaft hole 27a. The projection 27b is meshed with the male thread part 22c of the lead screw shaft 22. The arm part 27c has a resilient property, and cooperates with the projection 27b to sandwich the male thread part 22c of the lead screw shaft 22 between the projection 27b and the arm part 27c itself. One end 28a of the rack presser spring 28 is hooked to the arm part 27c. The output part 27d transmits torque of the lead screw shaft 22 as a driving force from the stepping motor to an external device. The other end 28b of the rack presser spring 28 is hooked to the spring hook part 27e.

The rack presser spring 28 has its one end 28a hooked to the arm part 27c of the rack 27 and its other end 28b hooked to the spring hook part 27e of the rack 27 to thereby urge the projection 27b of the rack 27 against the male thread part 22c of the screw shaft 22.

In the present embodiment, the axial position of the lead screw shaft 22 is determined by abutment of the spherical surface-shaped (sphere R-shaped) foremost end of the first shaft part 22a against the bottom surface of the hole 21a of the first bearing 21a. As a consequence, axial displacement of the lead screw shaft 22 caused during rotation of the same is suppressed, which results in enhancement of accuracy in axial motion of the rack 27 meshed with the male thread part 22c of the lead screw shaft 22. The shaft presser spring 25 also acts as a stopper for preventing the second bearing 24 from falling off the hole 23k of the angle 23.

Further, in the present embodiment, the angle 23 not only supports the lead screw shaft 22, but it also plays the role, similar to that of the top plate 12 in the first embodiment, of being fixed to the stator 1 in a manner sandwiching the bobbin 5 between the stator 1 and the top plate part 23a while covering one end face of the magnet 8 in the axial direction.

The stepping motor constructed as above provides more advantageous effects than a stepping motor having a construction in which an angle is additionally secured to a top plate provided separately from the angle, i.e. a discrete unit of the stepping motor like the stepping motor according to the first embodiment. First of all, since the number of component parts can be reduced, it is possible to reduce manufacturing costs and shorten the axial length of the stepping motor.

Further, since the lead screw shaft 22 is supported by the stator 1 and the angle 23 rigidly secured to the stator 1, coaxial deviation in between the two support members can be minimized. As a result, the gaps between the outer peripheral surface of the magnet 8 and the inner peripheral surfaces of the respective first and second outer magnetic pole parts 1a and 1b can be made uniform, which makes it possible to cause the stepping motor to perform stable rotation.

Further, since the lead screw shaft 22 plays the role of the rotary shaft of the stepping motor, the present stepping motor does not necessitate joining of a lead screw shaft and a rotary shaft, differently e.g. from a stepping motor having a lead screw shaft and a rotary shaft as separate members. Thus, there is no deviation of the center due to joining, and therefore it is possible to cause the stepping motor to perform stable rotation and achieve considerable reduction of manufacturing costs.

Furthermore, since the stepping motor is also provided with the rack 27 meshed with the lead screw shaft 22, and the rack support bar 28, rotation of the magnet 8 can be converted into axial motion of the rack 27 via the lead screw shaft 22. This makes it possible to drive a lens or the like for linear motion, with step control by the present stepping motor alone without using another mechanism, such as reduction gears.

It should be noted that a stepping motor rotation driving method in the present embodiment is identical to that in the first embodiment, and therefore description thereof is omitted.

As described above, according to the present embodiment, since the angle 23 supporting the lead screw shaft 22 covers the one end of the magnet 8, it is not necessary to provide a top plate. Further, it is possible to make the axial length of the stepping motor shorter, comparing with a stepping motor to which an angle is mounted additionally, whereby it is possible to achieve reduction of manufacturing costs and downsizing of the stepping motor.

Further, since the lead screw shaft 22 is supported by the stator 1 and the angle 23 rigidly secured to the stator 1, coaxial deviation in between the two support members can be minimized. As a result, the gaps between the outer peripheral surface of the magnet and the inner peripheral surfaces of the respective first and second outer magnetic pole parts can be made uniform, which makes it possible to cause the stepping motor to perform stable rotation.

Further, since the lead screw shaft 22 plays the role of the rotary shaft of the stepping motor, the present stepping motor does not necessitate joining of a lead screw shaft and a rotary shaft, differently e.g. from a stepping motor having a lead screw shaft and a rotary shaft as separate members. Thus, there is no deviation of the center due to joining, and therefore it is possible to cause the stepping motor to perform stable rotation and achieve considerable reduction of manufacturing costs.

Furthermore, since the stepping motor is also provided with the rack 27 and the rack support bar 28, rotation of the magnet 8 can be converted into axial motion of the rack 27 via the lead screw shaft 22. This makes it possible to drive a lens or the like for linear motion, with step control by the present stepping motor alone without using another mechanism, such as reduction devices.

To sum up the advantageous effects described above, the present embodiment makes it possible to provide a low-cost and high-output stepping motor with a lead screw reduced in size and axial length.

Although in the above described first and second embodiments, the stepping motor and the stepping motor with a lead screw are described by way of example, the present invention is not limited to these embodiments, but can be modified in various manners based on the subject matter of the present invention, which should not be excluded from within the scope of the present invention insofar as functions as recited in the appended claims or the functions performed by the construction of either of the above described embodiments can be achieved.

Further, although in the first and second embodiments, the present invention is applied to the discrete unit of the stepping motor, this is not limitative, but the present invention can also be applied e.g. to a case where the stepping motor according to the present invention is incorporated in an electronic apparatus, such as an image pickup apparatus, for driving a lens or the like for linear motion with step control.

This application claims the benefit of Japanese Application No. 2005-118468, filed Apr. 15, 2005, which is hereby incorporated by reference herein in its entirety.

What is claimed is:

1. A driving device comprising:
   a rotor having a core formed of a soft magnetic material and a lead screw shaft fitted in the core;
   a magnet having a cylindrical shape and being magnetized such that different poles alternate in a circumferential direction, the magnet having a bore part in which the core of said rotor is rigidly fitted, wherein the rotor serves as an inner magnetic pole part;
   a bobbin member having a first bobbin part, a second bobbin part, and a cover part covering an outer peripheral surface of the magnet, wherein the first bobbin part, the second bobbin part, and the cover part are integrally formed with the bobbin member;
   a first coil wound around the first bobbin part;
   a second coil wound around the second bobbin part;
   a stator having a base part, and first and second outer magnetic pole parts axially extending from the base part, the stator being directly attached to the bobbin member with the first outer magnetic pole part passing through the first bobbin part and with the second outer magnetic pole part passing through the second bobbin part;
   a rack that meshes with the lead screw shaft;
   an angle member fixed to the first outer magnetic pole part passing through the first bobbin part and the second outer magnetic pole part passing through the second bobbin part, wherein the angle member having a plate part, an arm part axially extending from the plate part, and a holding part extending from the arm part to parallel with the plate part, and wherein the plate part is formed with a first hole and a second hole into which the first outer magnetic pole part and the second magnetic pole part are respectively inserted; and
   a rack-retaining bar that is attached to the angle member and that supports the rack such that the rack is moveable in a direction parallel to an axis of the lead screw shaft,
   wherein the lead screw shaft is rotatably supported by a first bearing mounted on the base part of the stator and a second bearing mounted on the holding part of the angle member.

2. A driving device as claimed in claim 1, wherein the first and second outer magnetic pole parts are each bent at a right angle from the base.

3. A driving device as claimed in claim 1, wherein the first bearing is formed of a soft magnetic material, and the first bearing is arranged between the first coil and the second coil with respect to a radial direction of the rotor with the shaft of the rotor passing therethrough, and adapted to support the core of the rotor with respect to an axial direction of the rotor.

* * * * *